United States Patent [19]

Bates et al.

[11] 4,057,778
[45] Nov. 8, 1977

[54] BUILT-IN TEST EQUIPMENT FOR SONOBUOY

[75] Inventors: Albert M. Bates, Southampton; Anthony J. Madera, Doylestown, both of Pa.

[73] Assignee: The United States of America as represented by the Secretary of the Navy, Washington, D.C.

[21] Appl. No.: 737,305

[22] Filed: Nov. 1, 1976

[51] Int. Cl.² .............................................. H04B 11/00
[52] U.S. Cl. ....................................... 340/2; 340/5 C
[58] Field of Search ................................... 340/2, 5 C

[56] References Cited

U.S. PATENT DOCUMENTS 3,875,548   4/1975   Acks .................................... 340/2

Primary Examiner—Richard A. Farley
Attorney, Agent, or Firm—R. S. Sciascia; Henry Hansen; William J. Iseman

[57] ABSTRACT

Test equipment is employed within a conventional sonobuoy system for self-testing operational signal parameters of the sonobuoy. Sonobuoy reference and phase pilot signals and modulator carrier signals are sequentially sampled and compared with reference signal levels to drive failure indicators which note the respective signal failures.

11 Claims, 3 Drawing Figures

BUILT-IN TEST EQUIPMENT FOR SONOBUOY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to testing equipment and particularly to test equipment that is built within a conventional sonobuoy system for self testing selected ones of the operating parameters of the sonobuoy.

Sonobuoys have long been used in modern times to provide an acoustic monitoring device in the vicinity of sources of underwater acoustic energy so as to provide a remote monitoring of the sources. A sonobuoy package typically contains a device to control the descent of the sonobuoy from an aircraft into the water and a telemetering electronics package which transmits the acoustic signals intercepted by the sonobuoy to the aircraft by means of a radio frequency telemetering link. The electronics package of one sonobuoy type comprises a plurality of hydrophones prearranged about orthogonal axes, a compass, oscillators, phase shifters and modulators which provide input signals to a transmitter which is coupled to an antenna. A few of the critical sonobuoy operational parameters involve the generation of a reference pilot signal, a phase pilot signal, and modulator carrier signals which are in quadrature phase relationship. Although the state of the art of the design and fabrication of electronics packages have obtained a high order of quality control, individual variations nonetheless exist between individual units with a variety of possible failures occurring within the sonobuoy either during the manufacturing process or initial deployment within the water. In other instances critical signal parameters, although operational, digress outside acceptable operating limits and compromise data integrity which unknowingly is accepted as valid data at the receiving station.

One prior art method of calibrating and checking sonobuoy operation involves the selective injection of a calibration signal into the electronics system. Such a method provides a go or no-go indication of sonobuoy operation but does not specifically point out the subcircuit failure. For these and a variety of other reasons, the need has been felt for a device for sampling a plurality of operational parameters within a sonobuoy system in order to test the parameters within predetermined tolerances for satisfactory performance and for specifically indicating the failure of critical signals generated within the package.

SUMMARY OF THE INVENTION

Accordingly, it is an object of the present invention to provide a device for testing specific operating parameters of a sonobuoy system in order to indicate the failure of one or more of the signals being tested. Another object of the invention is to incorporate the test equipment device into a conventional sonobuoy package for self testing purposes in order to provide testing facilities both during manufacture and during deployment. Yet another object of the present invention is to test critical operating parameters of a sonobuoy system for operation within predetermined tolerances. A further object of the present invention is to provide built-in test equipment for a sonobuoy which will not interfere with normal operation of the sonobuoy electronics.

Briefly, these and other objects are accomplished by test equipment which is easily packageable within a conventional sonobuoy system for self-testing operational signal parameters of the sonobuoy. In particular, sonobuoy reference pilot, phase pilot and modulating carrier signals are sequentially sampled and compared with predetermined reference signal levels to drive a plurality of failure indicators which specifically note the respective signal failures within the electronics package.

For a better understanding of these and other aspects of the invention, reference may be made to the following detailed description connected in conjunction with the accompanying drawings.

DESCRIPTION OF THE PREFERRED EMBODIMENT

Figure 1:
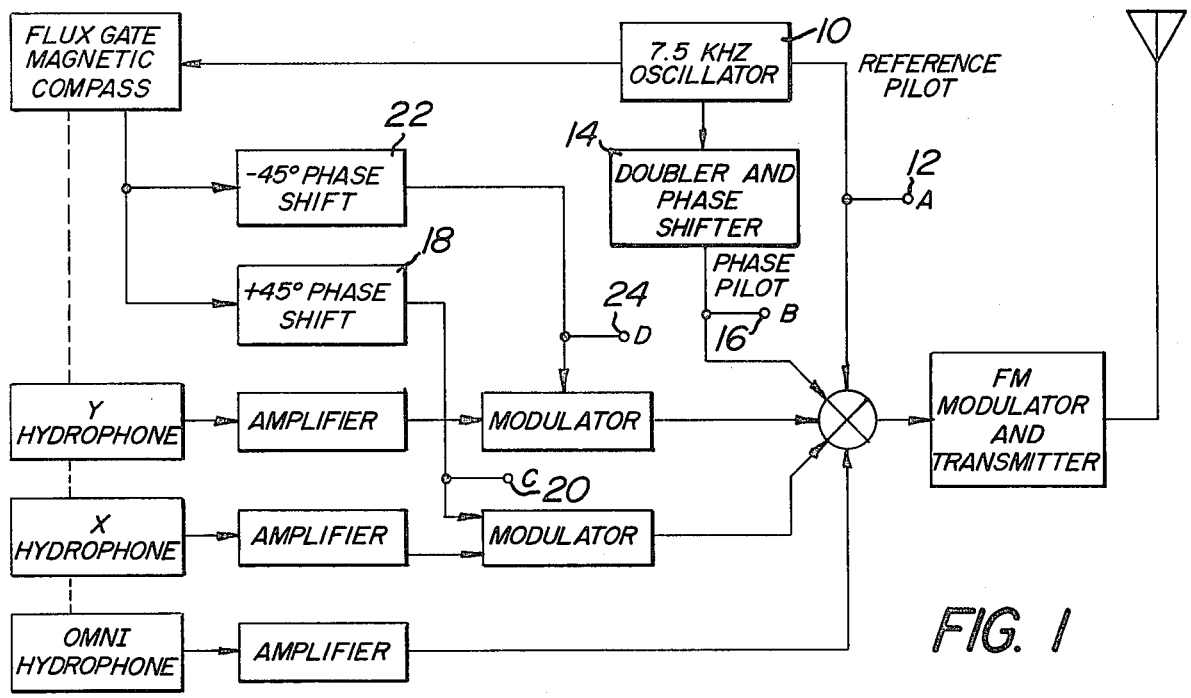
FIG. 1 is a block diagram of a typical sonobuoy electronics package utilized in conjunction with the present invention.

Referring now to FIG. 1, there is shown a block diagram of a typical sonobuoy system having a 7.5 KHz oscillator 10 whose output generates a reference pilot signal A at an output terminal 12. The oscillator 10 output is also received by a doubler and phase shifter 14 which produces a phase pilot signal B at an output terminal 16. The oscillator 10 also drives a flux gate magnetic compass which produces a doubled signal of 15 KHz at its output which is phase shifted in proportion to the mechanical position of the compass with respect to magnetic north. The compass output is then phase shifted +45° by a first phase shifter 18 to produce a 15 KHz modulating carrier signal C at an output terminal 20. The compass output is also shifted −45° by a second phase shifter 22 to produce a 15 KHz modulating carrier signal D at an output terminal 24. The modulating carrier signals C and D thereby produce quadrature signals 90° out of phase with each other and in conjunction with the reference pilot signal A and the phase pilot signal B comprise three of the more critical operating signal parameters of the sonobuoy.

Figure 2:
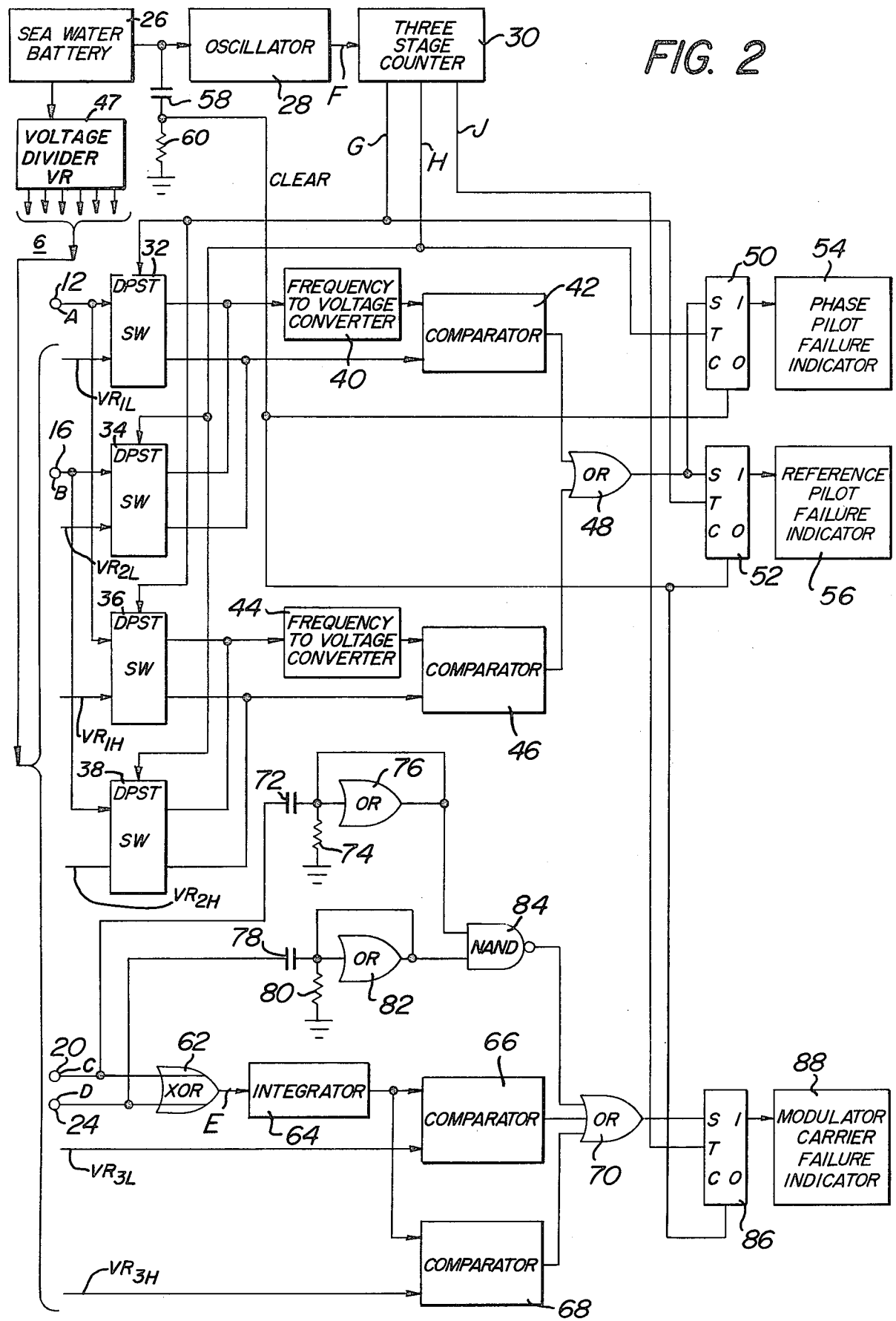
FIG. 2 is a block diagram of test equipment made according to the invention and designed to work in conjunction with the sonobuoy electronics shown in FIG. 1.

Referring now to FIG. 2, there is shown a block diagram of the built-in test equipment of the present invention designed to be used in conjunction with the sonobuoy block diagram of FIG. 1. A sea water battery 26 having a predetermined life span provides output power to an oscillator 28 which drives a three stage counter 30. The first and second output signals of the counter 30 denoted respectively as G and H are connected to a bank of double pole single throw switches 32, 34, 36, 38 with switches 32 and 36 receiving at their actuating inputs the first stage output signal G, and switches 34 and 38 receiving at their actuating inputs the second stage output signal H. The switches are conventional in design and may comprise, for example, an integrated circuit CMOS switch connected to receive the control input signal from the counter 30. Switch 32 is connected to receive the reference pilot signal A at one input terminal which is switched to the input of a frequency to voltage converter 40. The other input terminal of switch 32 is connected to receive a first voltage reference signal $VR_{1L}$ which is switched to one input of a first comparator 42 having its other input connected to receive the output from the converter 40. Switch 34 is connected to receive the phase pilot signal B at one input which is switched to the input of the converter 40 and at the other input is connected to receive a second voltage reference signal $VR_{2L}$ which is switched to the input of the comparator 42. Switch 36 is connected to receive at one input the reference pilot signal A which is switched to the input of a second frequency to voltage converter 44 and at the other input is connected to receive a third reference voltage signal $VR_{1H}$ which is switched to one input of a second comparator 46 whose other input is connected to receive the output from the converter 44. Switch 38 is connected to receive at one input the phase pilot signal B which is switched to the input of converter 44 and at the other input is connected to receive a fourth reference voltage signal $VR_{2H}$ which is switched to the input of comparator 46. Each of the comparators 42, 46 is connected to the input of an OR gate 48 whose output is commonly connected to the respective set inputs of a pair of clocked "D" flip-flops 50, 52. The trigger or clock input of flip-flop 50 connected to receive the second stage output signal H of the counter 30 and the trigger input of flip-flop 52 is connected to receive the first stage output signal G from the counter 30. The "1" outputs of the flip-flops 50, 52 are connected ,respectively, to a phase pilot failure indicator 54 and a reference pilot indicator 56. Each of the flip-flops 50, 52 incorporates a clear or reset input which, when actuated, overrides any input signals present on the trigger inputs of the devices. The clear inputs are commonly connected intermediate a capacitor 58 having its other end connected to receive the output from the battery 26 and a resistor 60 having its other end connected to ground and which components form an integrating circuit whose purpose will be explained in more detail hereinafter. The modulator carrier signals C and D are received at the respective inputs of an XOR (exclusive OR) gate 62 whose output is connected to an integrator 64 which provides common outputs to respective first inputs of a pair of comparators 66, 68. The other inputs of the comparators 66, 68 are connected respectively to receive a fifth voltage reference signal $VR_{3L}$ and sixth voltage reference signal $VR_{3H}$. A three input OR gate 70 is connected to receive the outputs from comparator 66, 68. The modulator carrier signal C is also connected to the input of a first differentiating circuit formed by the combination of a capacitor 72 and resistor 74 which are connected therebetween to both the input and output of an OR gate 76. Similarly, the modulator carrier signal D is connected to a second differentiating circuit formed of the combination of a capacitor 78 and resistor 80 which are connected therebetween to both the input and output of an OR gate 82. A NAND gate 84 is connected to receive the outputs from both of the OR gates 76, 82 and provides an output to the third input of OR gate 70. Gate 70 provides an output to the set input of the flip-flop 86 whose trigger input is connected to receive the third stage output signal J from the counter 30. The flip-flop 86 is also provided with a clear input similar to that of flip-flops 50, 52 and which is connected in common to receive the clear signal from the integrating circuit 58, 60. The "1" output of the flip-flop 86 is connected to the input of the modulator carrier failure indicator 88. Each of the indicators 54, 56, and 88 are conventional in design and may comprise a series of light bulbs, tone generators or other visual or aural indicating means which are well known to those skilled in the art.

Figure 3:
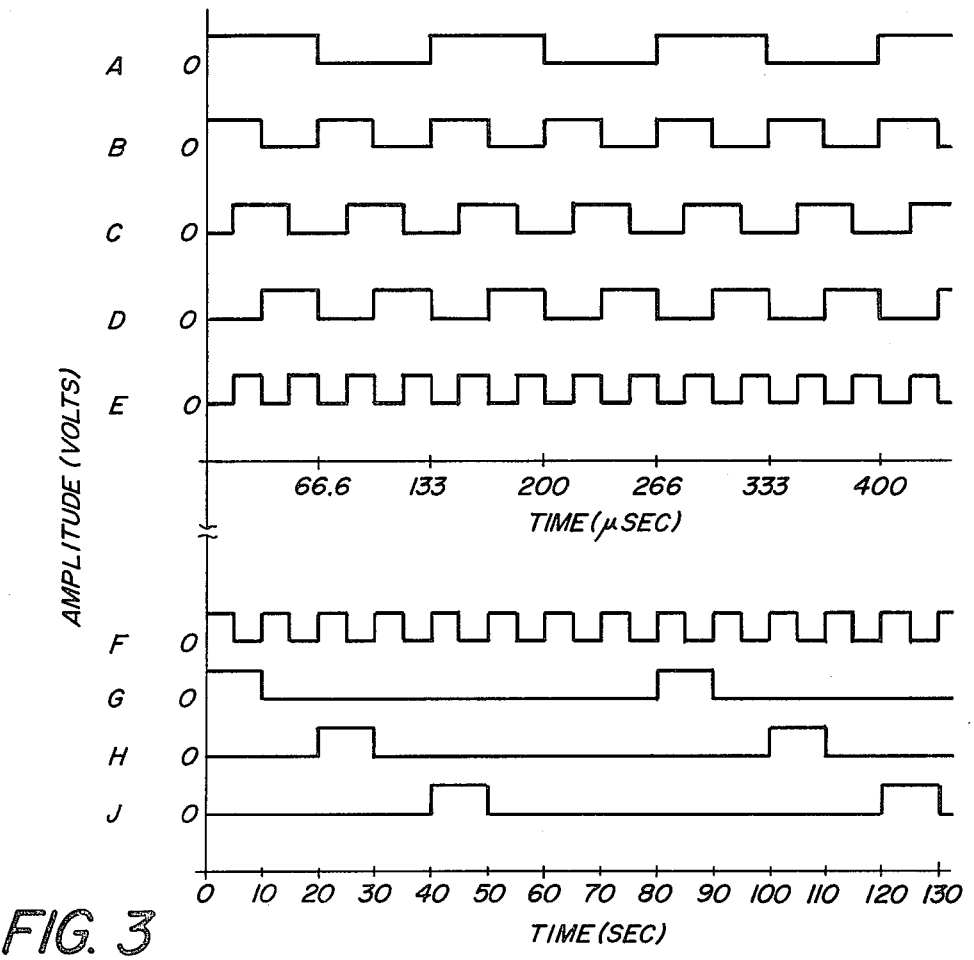
FIG. 3 illustrates a series of timing signal waveforms generated both within the electronics shown in FIG. 1 and the test equipment of the invention shown in FIG. 2.

Referring to FIG. 3 in conjunction with FIG. 2, the operation of the invention will now be explained. FIG. 3 illustrates a series of waveform signals and pulse timing arrangements which are denoted alphabetically as signals originating in either the sonobuoy electronics package or the built-in test equipment of the present invention. For purposes of clarity and more complete understanding of the present invention, waveforms A–E are shown related to a first time base wherein one full cycle of waveform B has a time duration of 66.6 microseconds which is in approximate correspondence to the beforenoted 15 KHz frequency. Waveforms F–J are shown related to a second time base wherein one full cycle of waveform F occupies a time duration of approximately 10 seconds which is illustrative of the exemplary operating frequency of 0.1 Hz of the oscillator 28. The sea water battery 26 is designed with a limited life of, for example, approximately 2 minutes in which time it generates an output voltage to supply power to the various structural components of the test equipment shown in FIG. 2. The operating time of the battery 26 is necessarily limited in that the testing sequence performed by the test equipment is generated only over a limited time period so as not to interfere with the continued operation of the sonobuoy electronics. The oscillator 28 generates a 0.1 Hz output signal, more clearly shown in waveform F, which drives the counter 30 to sequentially produce a series of three output pulse signals shown in FIG. 3 as waveforms G, H and J. The battery 26 also provides an output signal to the integrator combination 58, 60 whose capacitive and resistive values are so chosen as to provide an output voltage signal sufficient to hold clear the flip-flops 50, 52, and 86 for a time period sufficient to allow all circuits to assume a stable operating point after the transient period of voltage application.

Upon receiving the first stage output pulse shown in waveform G, the switches 32 and 36 are activated to connect the reference pilot signal A to the respective frequency to voltage converters 40, 44 which provide output signals having a voltage level proportional to the frequency of the reference pilot signal. Each of the switches 32, 36 respectively switch the voltage reference signals $VR_{1L}$ and $VR_{1H}$ to the inputs of the respective comparators 42, 46. The voltage reference signals may be generated in any conventionally and well known fashion such as a voltage divider 47 driven by the battery 26. In the case of the reference voltage $VR_{1L}$, a predetermined voltage level is chosen in accordance with the conversion characteristics of the converter 40 to represent that voltage level indicative of the lowest possible operating frequency that the reference pilot signal A may operate. Similarly, the voltage reference signal $VR_{1H}$ is is a predetermined voltage level chosen according to the operational characteristics of the converter 44 so as to represent that voltage level indicative of the highest allowable frequency tolerance of the reference pilot signal A. The comparators 42, 46 operate in such a manner that when either the output signal from the converter 40 falls below voltage reference $VR_{1L}$ or the output signal from the converter 44 exceeds the voltage reference $VR_{1H}$ level, the respective comparator will provide an active output to one of the inputs of OR gate 48. Similarly, the second stage output signal H from the counter 30 is connected to concurrently actuate the switches 34, 38 to transfer the phase pilot signal B into the converters 40 and 44. Concurrently, the voltage reference signal $VR_{2L}$, representing a voltage proportional to the lowest acceptable frequency of the phase pilot signal B, is switched to the input of comparator 42 and voltage reference level $VR_{2H}$, representing a voltage level indicative of the highest allowable frequency of the phase pilot signal B, is switched to the input of comparator 46. Thus, at the occurrence of the first output pulse from the counter 30 the comparators 42 and 46 compare the incoming reference pilot signal A against both high and low tolerance voltage levels indicative of maximum and minimal frequency tolerances. During the occurrence of the second output signal H from the counter 30, comparators 42, 46 compare the incoming phase pilot signal B with voltage reference levels indicative of the allowable frequency tolerances from the phase pilot signal. Should any of the foregoing noted signals be outside the allowable predetermined limits, one of the inputs of OR gate 48 will be activated and each of the flip-flops 50, 52 will have a high active signal on the set inputs thereof. Flip-flop 52 is triggered to produce a "1" output upon the occurrence of the first stage output signal G from the counter 30 which in turn will activate the reference pilot failure indicator 56. Similarly, flip-flop 50 is triggered upon the occurrence of the second stage output signal H from the counter 30 to produce a "1" output which activates the phase pilot failure indicator 54.

As noted hereinbefore, the modulator carrier signals C and D are each 15 KHz in frequency and are generated in a quadrature relationship having a 90° phase difference. This quadrature relationship is tested for by means of the XOR gate 62 whose output under normal operating conditions is as noted in waveform E. The XOR gate 62 operates to provide a pulse output when both of the signal inputs C and D are at opposite signal levels as noted in the waveforms of FIG. 3. As shown in FIG. 3, waveform E illustrates the normal 90° phase relationship between the modulator carrier signals C and D. If, for example, waveforms C and D would begin to shift their phase relationship, waveform E would show either an increasing or decreasing pulse width proportional to the changing phase relationship of the input signals. The pulses as shown in waveform E are used to drive the integrator 64 which integrates the signal levels over the pulse width periods and produces an output voltage which is commonly connected to inputs of the comparators 66, 68. Comparator 66 compares the incoming integrated voltage against the voltage reference signal $VR_{3L}$ which is a predetermined voltage level formed according to the operating characteristics of the integrator 64 so as to produce a voltage level indicative of the lowest acceptable decrease in phase shift between the modulator carriers signals C and D. Comparator 68 is connected to receive the voltage reference signal $VR_{3H}$ which is predetermined and characterized according to the operational parameters of the integrator 64 to provide an output voltage level indicative of the highest allowable phase difference between the modulator carrier signals C and D. Each of the comparators 66, 68 provide an output to two of the three inputs of OR gate 70. Should the phase difference between the carrier signals C and D be outside the predetermined tolerances, OR gate 70 provides an output to the set input of flip-flop 86 which, upon receipt of a trigger signal generated by the third output stage signal J of counter 30 produces a "1" output to activate the modulator carrier failure indicator 88.

The absence of one or both of the modulator carrier signals C and D is detected by the respective differentiating circuits 72, 74 and 78, 80, and OR gates 76, 82 in conjunction with NAND gate 84. Differentiator circuit 72, 74 is connected to receive modulator carrier signal C and provides a series of spiked pulses in accordance with the positive going edges of the signal C to the input of OR gate 76. On receipt of the first positive going pulse, OR gate 76 provides a high output pulse which is fed back to the input of the gate to hold the gate in a high active state which is communicated to one input of the NAND gate 84. Similarly, differentiator 78, 80 provides a series of spike pulse outputs in accordance with the positive going edges of modulator carrier signal D with the first of said pulses setting OR gate 82 to a high active state which is communicated to the second input of NAND gate 84. Upon receiving two high active state inputs, the gate 84 provides a low output to the third input of OR gate 70 which indicates pulse activity on both of the modulator carriers C and D. Should either signal C or D be absent, the respective OR gates 76, 82 provide a low state input to the gate 84 which causes the output of gate 84 to go high and thus trigger OR gate 70 to set flip-flop 86 to a "1" output upon the occurrence of a trigger pulse from the third output stage signal J of counter 30 thus actuating the modulator carrier failure indicator 88. Thus the indicator 88 signals both an unacceptable phase relationship between the modulator carrier signals or the absence of one or both of the signals.

Thus it may be seen that there has been provided novel built-in test equipment for sonobuoys wherein critical operating parameters such as reference and phase pilot signals as well as modulator carrier signals are tested for acceptable performance within predetermined tolerances.

Obviously, many modifications and variations of the invention are possible in light of the above teachings. For example, other signals of a similarly critical nature may be self-tested with built-in equipment to more particularly define the operational capabilities of a sonobuoy system. Additionally, any one or combination of failure indicators may be adapted to inhibit sonobuoy operation based upon a predetermined decision to terminate operation upon the failure of a critical operating parameter. It is therefore to be understood that within the scope of the appended claims, the invention may be practiced otherwise than as specifically described.

What is claimed is:

1. Built-in equipment for self testing a plurality of operating signals within a sonobuoy, comprising, in combination:
    sampling means adapted to receive the operating signals for sampling respective ones of the operating signals and for sequentially producing sample signals thereof;
    reference means for generating a plurality of reference signals each indicative of the tolerance level of a respective one of the operating signals; and
    comparison means connected to receive said sample and reference signals for comparing the corresponding respective ones of said sample and reference signals and for producing tolerance signals each indicative of a respective one of the operating signals when beyond its tolerance level.

2. Test equipment according to claim 1 further comprising means for energizing said sampling means and said comparison means for a predetermined period of time.

3. Test equipment according to claim 2 further comprising indicating means connected to receive respective ones of said tolerance signals for indicating the failure of specific ones of the operating signals.

4. Built-in equipment according to claim 1 wherein said reference signals correspond to the maximum and minimum tolerance levels of the operating signals.

5. Built-in equipment for self testing the reference pilot, phase pilot and X and Y modulator carrier operating signals of a sonobuoy, comprising, in combination: counting means for sequentially producing first, second and third output signals;

reference means for generating a plurality of reference signals each indicative of the tolerance level of a respective one of the operating signals; switching means adapted to receive the reference pilot and phase pilot operating signals and connected to receive the corresponding reference signals and said first and second output signals for sampling the reference pilot operating signal and the corresponding reference signal upon receipt of said first output signal, and connected to receive the phase pilot operating signal and the corresponding reference signal upon receipt of said second output signal, for producing sample signals representative thereof;

first comparison means connected to receive said sample signals for comparing the sampled reference pilot signal and the sampled phase pilot signal with respective corresponding ones of the sampled reference signals and for producing tolerance signals each indicative of a respective one of the reference pilot and phase pilot operating signals when beyond its tolerance level; and second comparison means adapted to receive the X and Y modulator carrier operating signals and connected to receive said third output signal and the corresponding reference signals for producing tolerance signals each indicative of a carrier operating signal when beyond its tolerance level.

6. Test equipment according to claim 5 further comprising means for energizing said counting means, said switching means, said first and second comparison means for a predetermined period of time.

7. Test equipment according to claim 6 wherein said energizing means is a seawater activated battery having an active life for the duration of the predetermined time period.

8. Test equipment according to claim 5 wherein said second comparison means further comprises:

differentiating means adapted to receive the modulator carrier operating signals for determining the absence of either or both of the carrier operating signals and for producing an output signal indicative thereof;

phase detecting means adapted to receive the modulator carrier operating signals and connected to receive corresponding reference signals indicative of a quadrature phase relationship between the carrier operating signals for comparing the carrier operating signals to the reference signals and for producing output signals indicative of the failure of the carrier operating signals to maintain the quadrature relationship; and means connected to receive said differentiating means output signal, said phase detecting means output signals and said counting means third output signal for producing said second comparator means tolerance signal.

9. Test equipment according to claim 8 wherein said phase detecting means further comprises:

an XOR gate adapted to receive the carrier signals and for producing an output signal having a pulse width proportional to the phase difference between the carrier signals;

an integrator connected to receive said XOR gate output signal for producing an integrated output signal representative thereof; and comparison means connected to receive said integrator output signal and said phase detecting means reference signals for comparing the integrated signal with the reference signals and for producing said phase detecting means output signals.

10. Test equipment according to claim 9 wherein said switching means comprises a plurality of double pole single throw CMOS switches, each of said switches having first and second inputs adapted to receive, respectively, a selected sonobuoy signal and the corresponding reference signal a third input connected to receive a selected one of the output signals from said counting means and a pair of outputs for passing the first and second input signals upon receipt of a selected one of said counting means output signals at said third input.

11. Test equipment according to claim 10 further comprising indicating means connected to receive said comparison means output signals and said second comparison means tolerance signals for indicating the failure of specific ones of the reference pilot signal, the phase pilot signal and the X and Y modulator carrier signals.

* * * * *